US005923830A

United States Patent [19]
Fuchs et al.

[11] Patent Number: 5,923,830
[45] Date of Patent: Jul. 13, 1999

[54] NON-INTERRUPTING POWER CONTROL FOR FAULT TOLERANT COMPUTER SYSTEMS

[75] Inventors: Stephen Fuchs, Chanhassen; Andrew J. Wardrop, Lakeville, both of Minn.

[73] Assignee: General Dynamics Information Systems, Inc., Bloomington, Minn.

[21] Appl. No.: 08/852,487

[22] Filed: May 7, 1997

[51] Int. Cl.$^6$ ................................................. G06F 11/00
[52] U.S. Cl. ....................................................... 395/182.09
[58] Field of Search ........................ 395/182.09, 182.08, 395/800.01, 750.01, 750.06, 750.08; 371/36; 364/131, 184, 187, 707; 326/35

[56] References Cited

U.S. PATENT DOCUMENTS

| | | | |
|---|---|---|---|
| 4,015,246 | 3/1977 | Hopkins, Jr. et al. | 340/172.5 |
| 4,799,140 | 1/1989 | Dietz et al. | 364/140 |
| 4,926,281 | 5/1990 | Murphy | 361/55 |
| 4,967,347 | 10/1990 | Smith et al. | 364/200 |
| 5,276,823 | 1/1994 | Cutts, Jr. et al. | 395/575 |
| 5,423,024 | 6/1995 | Cheung | 395/575 |
| 5,572,620 | 11/1996 | Reilly et al. | 395/182.09 |
| 5,596,756 | 1/1997 | O'Brien | 395/750 |
| 5,666,483 | 9/1997 | McClary | 395/182.08 |
| 5,799,198 | 8/1998 | Fung | 395/750.05 |

OTHER PUBLICATIONS

Johnson, Design and Analysis of Fault–Tolerant Digital Systems, Addison–Wesley Publishing Company, pp. 324–329, Dec. 1989.
Butler et al., "Techniques for Modeling the Reliability of Fault–Tolerant System with Markov State–Space Approach", NASA Reference Pub. 1348, Sep. 1995.
Nelson, Victor P. et al., Fault–Tolerant Computing (A Tutorial), no date.
Mathur, Francis P. et al., "Reliability Modeling and Analysis of General Modular Redundant Systems", published in IEEE Transaction Reliability, vol. R–24, No. 5, Dec. 1975.
Larson, Robert E., "Reconfigurable Distributed Computer System for On–Board Satellite Applications", published by Expert Base Systems, Inc. and submitted to DARPA, Apr. 30, 1987.
Barillot, Catherine et al., Review of Commercial Spacecraft Anomalies and Single–Event-Effect Occurrences, published in IEEE Transactions on Nuclear Science, vol. 4, Apr. 2, 1996, pp. 453–460.
Akers, L.D., "Microprocessor Technology and Single Event Upset Susceptibility", published in Small Satellites, 1996, pp. 1–10.

(List continued on next page.)

*Primary Examiner*—Robert W. Beausoliel, Jr.
*Assistant Examiner*—Stephen C. Elmore
*Attorney, Agent, or Firm*—William J. Kubida; Stuart T. Langley; Holland & Hart LLP

[57] ABSTRACT

A non-intrusive power control for a fault tolerant computer system which uses redundant voting at the hardware clock level. The computer includes three or more commercial central processing units (CPUs) operating synchronously. Outputs to system memory and system bus are voted by a radiation tolerant gate array which may be implemented in a custom integrated circuit. An interface control coupled to the voter can remove or connect power from a CPU and adjust CPU inputs, preventing damage to the components without terminating an operating program. The inputs and outputs at each write to and read from system memory are voted at each CPU clock cycle. A vote status and control circuit "reads" the status of the vote and controls the state of the CPUs using hardware and software. The system logic selects the best chance of recovering from a detected fault by re-synchronizing all CPUs, powering down a faulty CPU, or switching to a spare computer, resetting and re-booting the substituted CPU.

31 Claims, 10 Drawing Sheets

OTHER PUBLICATIONS

Krishna, C.M. et al., "Synchronization and Fault–Masking in Redundant Real–Time Systems", published in IEEE, 1984, pp. 152–157.

Maurer, Richard H. et al., "Single Event Upset and Latchup Sensitive Devices in Satellite Systems", published by the Johns Hopkins University Applied Physics Laboratory, no date.

McClusky, E.J., "Hardware Fault Tolerance", published by Center for Reliable Computing, Stanford University, 1986.

Schmid, H. et al., "Critical Issues in the Design of a Reconfigurable Control Computer", published in IEEE, 1984, pp. 36–41.

Pradhan, Dhiraj K., "Fault Tolerant Multiprocessor Link and Bus Network Architectures", published in IEEE Transactions on Computers, Nol. 34, No. 1, Jan. 1985, pp. 33–45.

Siewiorek, Daniel P. et al., "Reliable Computer Systems", Second Edition, published by Digital Press, 1992.

"Single Event Effect Criticality Analysis", pubication sponsored by NASA Headquarters, Feb. 15, 1996.

NON-INTERRUPTING POWER CONTROL FOR FAULT TOLERANT COMPUTER SYSTEMS

CROSS-REFERENCE TO A RELATED PATENT APPLICATION

The present Application is related to a commonly-owned and commonly-assigned U.S. patent application entitled Fault Tolerant Computer System, which was filed on Apr. 2, 1997 and has not yet been assigned a U.S. Ser. No.

INTRODUCTION

The title of this Application is Non-Interrupting Power Control for Fault Tolerant Computer Systems. The inventors are Stephen Fuchs of 660 Conestoga Trail, Chanhassen, Minn. 55317, and Andrew J. Wardrop of 17328 Judicial Road, Lakeview, Minn. 55044. Mr. Fuchs and Dr. Wardrop are citizens of the United States of America.

FIELD OF THE INVENTION

The present invention relates to the field of high performance, fault tolerant computer systems. More particularly, this invention provides dynamic, non-intrusive control of power to processors used in computers employing redundant voting at the hardware clock level. This invention may be used to detect and to correct errors in computers, especially remotely installed computers, such as those aboard spacecraft in orbit.

FEDERALLY SPONSORED RESEARCH OR DEVELOPMENT

Not Applicable.

BACKGROUND OF THE INVENTION

The natural radiation environment on Earth and in space can often cause short term and long term degradation of the semiconductor devices that are used in computers. This hazard is a problem for computers where fault-free operation is required. In addition to these radiation effects, computer chips are subject to random failures due to undetected defects and weaknesses that evolve over the course of time. Trace radioactive materials in semiconductor packages may also cause faults. When computers must operate for long periods in a remote environment, or where these devices must operate without fault for long periods of time, the need for systems which are protected from faults or failure becomes critical. Remote or vulnerable environments include remote oil platforms, submarines, aircraft and isolated sites such as Antarctica. Systems that operate in Earth orbit and beyond are especially vulnerable to this radiation hazard.

The presence of cosmic rays, and particularly high energy particles in space near the Van Allen radiation belt, can produce a disturbance called a single event effect (SEE) or a single event upset (SEU). The magnetic field of the Earth deflects particles and changes their energy levels and attributes. The Earth's magnetic field also traps charged particles that travel from the Sun and other stars toward the Earth. Some particles that are not trapped by the Earth's magnetic field are steered by that field into our atmosphere near the poles. These particles can penetrate the electronic devices aboard satellites.

When high energy particles and gamma rays penetrate a semiconductor device, they deposit charge within the computer circuit and create transients and/or noise. This can upset the memory circuits and induce a "latchup" of circuits on the chip. An upset may be generally defined as a mis-stated output of a component. This output may comprise one or more signal bits. Latchup is an electrical condition of a semiconductor in which the output of the device is driven and held at saturation because of the deposition of charge within a semiconductor circuit by the high energy particles. Devices based on complementary metal oxide semiconductor architectures (CMOS) are some of the most likely to be affected. A CMOS device comprises two NPN devices on the same substrate which share the same P channel. Latchup occurs when the stray charge starts a current in a first NPN device. The current is fed back to the other NPN device. If the gain of the circuit is greater than unity as a result of the feedback loop, the device moves to one state continuously and is said to be in latchup. This condition can cause a short between power and ground, local heating, migration of the semiconductor material and can eventually destroy the device. The correction of errors caused by device latchup usually involves reduction or removal of power to a processing unit or other component to prevent catastrophic damage that could result from a latched condition. The cause of the latched condition may be only a temporary upset. When power is reapplied, the component may function normally.

The upset rate of a component depends on the construction features of the chip, including size of the chip and internal circuit design. The upset rate for a particular part can vary from ten per day for a commercial, one megabit random access memory chip (RAM), to one every 2,800 years for a radiation-hardened one megabit RAM. A radiation-hardened component is a device that has been specially designed and built to resist the hazards of radiation. These devices tend to be much more expensive and slower than conventional chips. They generally tend to lag the state of the art by several years.

Current computer chips that are utilized in conventional applications on the ground are generally not threatened by cosmic radiation. This immunity is due to the protection offered by the Earth's atmosphere. There are, however, some terrestrial uses of computer chips that are subject to radiation upsets. Radiation emitted from diagnostic or therapeutic medical devices can affect semiconductor components. As devices become more complex, secondary and tertiary particles from atmospheric cosmic ray penetration will cause them to suffer upsets.

In their paper entitled *Review of Commercial Spacecraft Anomalies and Single-Event-Effect Occurrences*, Catherine Barillot et al. describe the upset events that have been observed in space since 1975. The events and their origins are traced and analyzed. Data are presented which show that the number of upsets encountered on the TDRS satellite follows the modulation of cosmic rays with the solar cycle.

L. D. Akers of the University of Colorado published a paper entitled *Microprocessor Technology and Single Event Upset Susceptibility*. The author points out that current satellites, which employ powerful microcircuits to control every aspect of a spacecraft, are increasingly vulnerable to heavy ion induced SEU. He predicts that the advent of microdevices having lower power and higher speed combined with the expected increase of particles from large solar flares will result in much higher rates of SEUs. He believes that the designers of small satellites will need to implement SEU mitigation techniques to ensure the success of future satellite missions.

A publication sponsored by NASA, entitled *Single Event Criticality Analysis*, Feb. 15, 1996, written by Allan Johnston, describes SEUs and related effects such as "latchup" in electronic devices caused by the passage of high energy particles. He points out the difficulty in overcoming the latchup at the system or subsystem level by sensing excess current, which is the telltale signature of a latchup. This difficulty arises because power must be removed from the affected component within milliseconds. Many different latchup paths and current signatures exist in complex circuits.

Johnston reports that high-energy protons and heavy ions found in radiation environments on Earth and in space lose energy as they pass through materials. This effect is primarily caused by ionization processes. The particles deposit a dense charge as they pass through an electronic component's P-N junction. Some of this charge will be collected at the junction contacts. Charge can also be collected from outside the junction. The net effect is a very short duration current pulse at the internal circuit node which is struck by the particle. A large fraction of the total charge collected by the circuit node occurs in about 200 picoseconds. If the charge collected from the particle strike exceeds the minimum charge required for the component to switch states, for example from non-conducting to conducting, then the passage of the particle will upset or otherwise affect the circuit. The minimum or "critical charge" depends on the design of the specific device which is struck. Several effects can be induced in integrated circuits by high-energy ion strikes:

(1) transient effects, such as single-event upsets and multiple-bit upsets, that change the state of internal storage elements, but which can be simply reset to normal operation;

(2) potentially catastrophic events, such as single-event latchup, that may cause destruction of a component unless quickly corrected; and (3) single-event hard errors, which cause catastrophic failure of a single internal transistor within a complex circuit.

Most junction-isolated integrated circuits contain parasitic, bipolar transistors that can form a four-layer region similar to that of a silicon controlled rectifier. These bipolar structures are not involved in normal operation of a CMOS device. They can be triggered by transient currents. All CMOS designs use special guardbands and clamp circuits at the input/output (I/O) terminals to prevent latchup in standard applications. However, in a radiation environment, transient signals are no longer confined to I/O terminals. It is possible for the current pulses from heavy ions or protons to trigger latchup in the internal region of the CMOS device as well as in I/O circuitry. Once latchup occurs, the four-layer region will be switched into a conducting state. It will remain in that state until the voltage in the latched region is reduced to a very low value. During latchup, currents can be very high. This is a serious problem for space systems. Johnston points out the difficulty in overcoming the latchup of at the system or subsystem level by sensing excess current, which is the signature of a latchup, because power must be removed from the affected component within milliseconds to avoid possible catastrophic damage. Many different latchup paths and current signatures exist in complex circuits.

Previous attempts to mitigate the radiation hazards that affect computer chips have met with mixed results. Work relating to fault tolerant computers has principally dealt with error detection at a high level, for example, at the register level. In their paper entitled *Synchronization and Fault-Masking in Redundant Real-Time Systems*, IEEE, 1984, pp. 152–157, C. M. Krishna et al. describe hardware synchronization and software synchronization of a number of phase-locked clocks in the presence of "malicious" failures. The authors describe a simple hardware voting strategy in which the output values of a clock are compared with the incoming signal of a reference clock. Non-faulty clocks are locked in phase. As processors fail, they are replaced by spares if they are available. This method applies to many redundant computers having multiple clocks which operate in close synchrony. Krishna et al. also describe the use of software algorithms to enable a system of many processors with their own clocks to operate in close synchrony.

The software solutions like those utilized by Krishna et al. employ voting procedures at software block levels. These solutions generally involve comparing computer outputs at a high level to see if each separate computer agrees with the others. Such systems pay a heavy price in weight, bulk, cost and power consumed to achieve high levels of redundancy.

Krishna et al. do not address the problem of a momentary upset of a system. Nor have the authors addressed the problem of faults limited to within any one component of a processor. The recognition of a fault in a system, such as that described by Krishna et al., means the entire device has failed. However, a radiation upset does not necessarily result in a failed device. The upset condition may be temporary.

In a paper entitled *Single Event Upset and Latchup Sensitive Devices in Satellite Systems* published by The Johns Hopkins University Applied Physics Laboratory, Richard M. Maurer and James D. Kinnison recognize the hazard of single event upset and latchup. They offer a decision tree as an aid to eliminating single event effects sensitive parts from a design, or using SEE sensitive parts as-is to provide some measure of protection in the design of circuits in which the parts will function. Maurer and Kinnison presume that the latched state will have some distinctly different characteristics from the normal operating state, so that a latchup protection circuit can be designed. While avoiding the use of radiation-hardened devices, their method of hardware protection imposes weight, volume and power penalties. There may also be performance impacts on the device itself, especially with respect to the speed of operation.

In their article on *Reliability Modeling and Analysis of General Modular Redundant Systems*, published in IEEE Transactions on Reliability, Vol. R-24, No. 5, December 1975, Francis Mather and Paulo T. de Sousa explain that hardware redundancy has been used to design fault-tolerant digital systems. They describe majority voting of redundant modules and quadded logic (replacement of every hardware gate by four gates) as hardware redundant structures.

E. J. McClusky published a paper entitled *Hardware Fault Tolerance*, in the Sixteenth Annual Institute in Computer Science at the University of California at Santa Cruz, Aug. 25, 1986. McClusky describes the basic concepts and techniques of hardware fault tolerancing. One such technique is "error masking," the ability to prevent errors from occurring at system outputs. Error masking is achieved, according to McClusky, with "massive redundancy." System outputs are determined by the voting of signals that are identical when no failures are present. The usual forms of massive redundancy are triple-modular redundancy, quad components, quadded and voted logic. McClusky reports that voted logic involves connecting all copies of a module to a voter. The outputs of each module are passed through the voter before being transmitted to other parts of the system. Voting is carried on at high level in the entire system. Quadded logic is described as replacing every logic gate with four gates. Faults are automatically corrected by the interconnection pattern of the gates. Such a system would clearly incur weight, power and cost penalties on the system that is being protected from radiation hazards.

While McClusky suggests that triple-modular redundancy can be applied to small units of replication as well as an entire computer, he does not describe how such a scheme might be implemented, except for the use of error correcting codes and certain software programs. Error correcting code methods rely on error correcting circuitry to change faulty information bits and is, therefore, only effective when the error correcting circuitry is fault-free. The software methods cited by McClusky require that several versions of a program be written independently. Each program runs on the same data and the outputs are obtained by voting. Such a technique may be effective for temporary faults, but requires a great deal of time and system overhead.

H. Schmidt et al. discuss the numerous critical issues which must be resolved prior to a detailed design of a reconfigurable computer, such as computers used for real time control systems, in *Critical Issues in the Design of a Reconfigurable Control Computer* published by the IEEE, 1984, pp. 36–41.

In his paper entitled *Fault Tolerant Multiprocessor Link and Bus Network Architectures*, published in the IEEE Transactions on Computers, Vol. 34, No. 1, January 1985, pp 33–45, Dhiraj K. Pardha presents a general class of regular networks which provide optimal or near optimal fault tolerance for a large number of computing elements interconnected in an integrated system.

Earlier high performance processors comprised a number of logic chips, a floating point chip and many memory chips used as local caches. Current processors contain all of these ftinctions in a single chip. This centralization of functions within a single chip permits the application of fault-tolerant methods to just a few chips in a processor system at the chip hardware level. As more and more devices are contained on one substrate, the processor chips become more and more dense. These devices, particularly complementary metal oxide, gallium-arsenide, and bipolar semiconductors devices and others, are then increasingly affected by radiation.

In their book entitled *Reliable Computer Systems*, Second Edition, published by Digital Press in 1992, Daniel P. Siewiorek and Robert S. Swarz discuss error detection, protective redundancy, fault tolerant software and the evaluation criteria involved in reliability techniques. Chapter Three of this text presents a comparison of computer output at the system level, register or transfer level, bus level module level and gate level. The authors describe triple-redundant modules plus voting that isolates or corrects fault effects before they reach module outputs. They also discuss use of back-up spares in a hybrid redundant system. That is, a core of N-modules operating in parallel, with a voter determining system output and with a set of back-up spare modules that can be switched in to replace failed modules in the core. FIG. 3–31 of this text depicts majority voting at the outputs of three module and/or three voters. Siewiorek et al. aver that this technique results in signal delay and decreases in performance. FIG. 3–57 shows the fault tolerant computer of Hopkins, Smith and Lala (1978) implemented from a set of processor/cache, memory and input/output modules, all interconnected by redundant, common serial buses. The computations of the computer are performed in triads: three processor/caches and three memories performing the same operation in voting mode and synchronized at the clock level. Because most processing utilizes the cache, voting is not performed at every clock cycle, but whenever data is transferred over the bus. The authors do not describe a system that includes multiple processors coupled by individual buses to a voter, which has a voter output connected to a single memory. Siewiorek and Swarz do not describe a system whose processor outputs and inputs are voted at each clock cycle. The authors do not discuss means for controlling power to dysfunctional processors as part of such a system.

The development of a fault tolerant computer based on commercially available parts, for use in military and commercial space vehicles, that would prevent permanent damage from latchup would offer significant operational and cost advantages. Such an invention would offer higher levels of performance and would cost less to manufacture than existing approaches based on radiation hardened chips. The invention could be used for remotely installed computer systems and other processors that are subject to random failures or to a radiation environment which produces single event upsets at unacceptably high rates. Such radiation upset protection would discover and correct errors. This fault protection system would provide a means to power off or power down affected processors without interfering with a running software application. It would be extremely beneficial if a fault tolerance method could be applied at a very low hardware level, for example, within a processor chip, instead of at the computer register or the output of computer modules. Such a system would satisfy a long felt need in specialized computer and satellite industries.

SUMMARY OF THE INVENTION

The present invention comprises an improved power control system which provides for the shutdown or power down of computer processors used in a redundant fault tolerant computer. The present invention solves the problem of "latchup" as well as others requiring removal of power from a device in a computing system without shutting down failing the whole system. This power control system is non-intrusive, that is, a device can be powered on or off by hardware or software without affecting a running software application. A preferred embodiment of the invention uses redundant voting at the hardware clock level to detect and to correct errors caused by radiation-induced single event upsets (SEUs) and random failures. Voting at the hardware clock level refers to comparing for agreement, data and address signals of a plurality of central processing units at every clock cycle. Correction of errors caused by device "latchup" usually involves the reduction or removal of power to a processing unit or other component to prevent catastrophic damage because of a latched condition. The cause of the latched condition may be only a temporary upset, and when power is reapplied, the component functions as expected. A signal to "shut-down" is generated by detection of an erroneous component output or of an unacceptable rise in current.

Single event upsets (SEUs) arc caused by high energy cosmic rays and particles depositing charge within semiconductor circuitry. Ground based equipment is shielded from cosmic rays by the atmosphere, but some attention has been paid to SFU caused by trace radioactive materials (alpha particles) in semiconductor packages. An upset is a misstated output of a component of one or more signal bits. An upset does not necessarily indicate a component is permanently faulty.

In the past, voting techniques have been used at higher system levels in long life space applications. The advances in semiconductor technology make it feasible to use redundant voting for non-radiation hardened commercial components at the hardware clock level. The higher integration levels now available allow redundant components with power control functions to be implemented for an entire system using only a few devices. The redundant functions and power controls can be implemented in one module using several processor chips and only a few others.

One preferred embodiment of computer architecture which implements this invention comprises a central processor module containing four commercial, single chip, central processing units (CPUs), a voter, a memory controller a system memory and a power strobe controller system. An alternative embodiments utilizes three commercial CPUs. Other embodiments utilize more than four CPUs. The CPUs are operated in strict "lockstep," that is, each operating step of each CPU is accomplished in parallel and substantially simultaneously with the other CPUs. A phase lock loop circuit controls this operation. All CPU outputs are "voted" in a radiation-tolerant voter, termed a "quad-voted" system. In the voting process, each of the CPU output signals is compared, one with another by a voter every clock cycle. The processors share a single system memory and a memory bus. Since the processors are in lockstep, they should all request the same memory access at the same time. Voted addresses are used for access to memory, voted data is written to memory and a system (I/O) bus through a radiation-tolerant memory controller. The voter, memory controller and power controller may be implemented readily in application specific integrated circuits (ASIC). Systems may be made radiation tolerant by using radiation hardened components, or by utilizing redundant designs.

The data read from memory and the system I/O bus is supplied to all processor chips simultaneously. The "reads" from memory are checked using conventional techniques. For example, well-known "Hamming codes," implemented in the memory-chip hardware, can check and correct a single bit error.

The output from each CPU is compared for agreement with the output from all other CPUs each clock cycle. Agreement of a majority of CPU output signals supplied to the voter results in a voted output signal which has the value of the majority. A CPU output signal which does not agree with the majority is detected by the voter, producing an error signal. The error signal is sent to the memory controller which reacts several ways:

1. The majority voted signal is used by the agreeing CPUs to continue CPU processing operations without interruption; if the CPU disagreement persists, a latchup condition may be indicated and the disagreeing CPU is powered down, then re-powered;
2. The disagreeing CPU is disabled from further participation in voting;
3. A system management interrupt (SMI) is generated to the other CPUs; and
4. At a later time, software initiates a re-synchronization process that recovers the disabled CPU.

In the event of failure of a computer, a spare, error-free computer is substituted. However, the use of the methods and apparatus embodied in this invention are expected to correct the faults described without the need to resort to substitution of a spare computer. A disabled system is powered down.

Typical CMOS components can not be powered off while their interface components remain powered. The application specific integrated circuit (ASIC) of this invention supports a powered down CPU by insuring that interface voltages to the CPU are driven to a non-stressed condition. An interface control section is provided in the ASIC for each CPU. The interface control operates so that when supply voltage ($V_{cc}$) is removed from a device, the input signals are driven to ground potential. Alternatively, if power is interrupted by removing the return/ground connection from the device, the input signals are driven toward supply voltage ($V_{cc}$) In another alternative, signals can be switched into a high impedance. In this way, the current flow between signal input and ground or signal input and supply voltage ($V_{cc}$) bus is minimal. Controlling the stress on a device when power is interrupted prevents degradation of its reliability.

The CPUs and other devices can be commanded to a powered down state during a mission to conserve power. In a spaceborne application, power down can be performed at various times in an orbit or trajectory where single event upset is not likely, or when bus power is low.

An appreciation of the other aims and objectives of the present invention and a more complete and comprehensive understanding of this invention may be obtained by studying the following description of a preferred embodiment and by referring to the accompanying drawings.

A BRIEF DESCRIPTION OF THE DRAWINGS

FIG. 1 is a schematic diagram of a computer system showing redundant computers connected to a system (I/O) bus.

FIG. 2a presents a schematic diagram of typical CMOS device with signal voltage and supply voltage ($V_{cc}$) applied. This diagram illustrates the need for conditioning the signal input when power is removed from the device.

Figure 3:
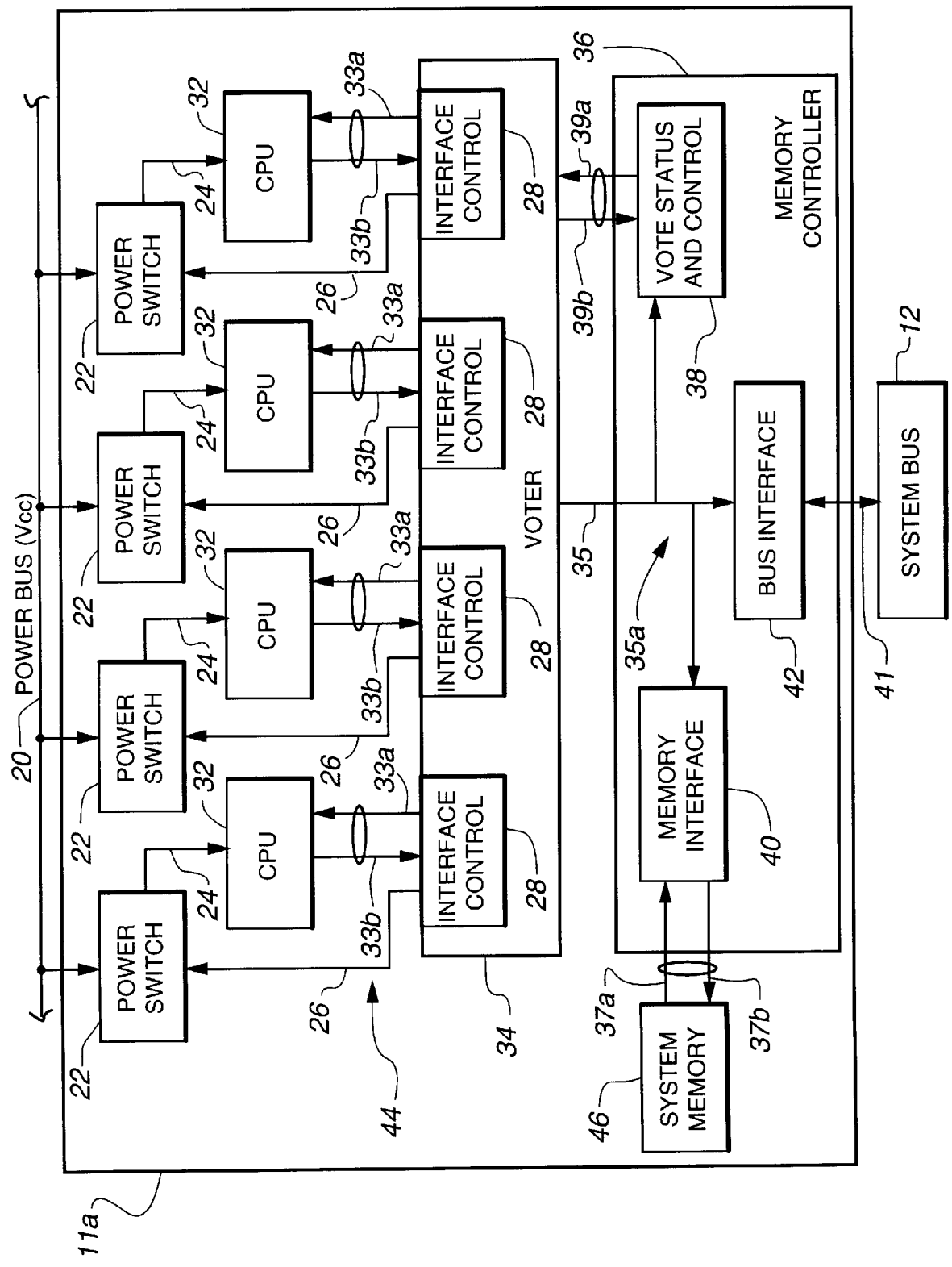

FIG. 3 is a schematic diagram of one preferred embodiment of the invention showing a computer having four commercial, non-radiation hardened central processor units (CPU) operating in parallel "lockstep" and having their outputs to system memory "voted." A power control "switch" interrupts power to a CPU and a device interface control conditions signals on the CPU bus to prevent overstressing the CPU when power is interrupted.

Figure 4:
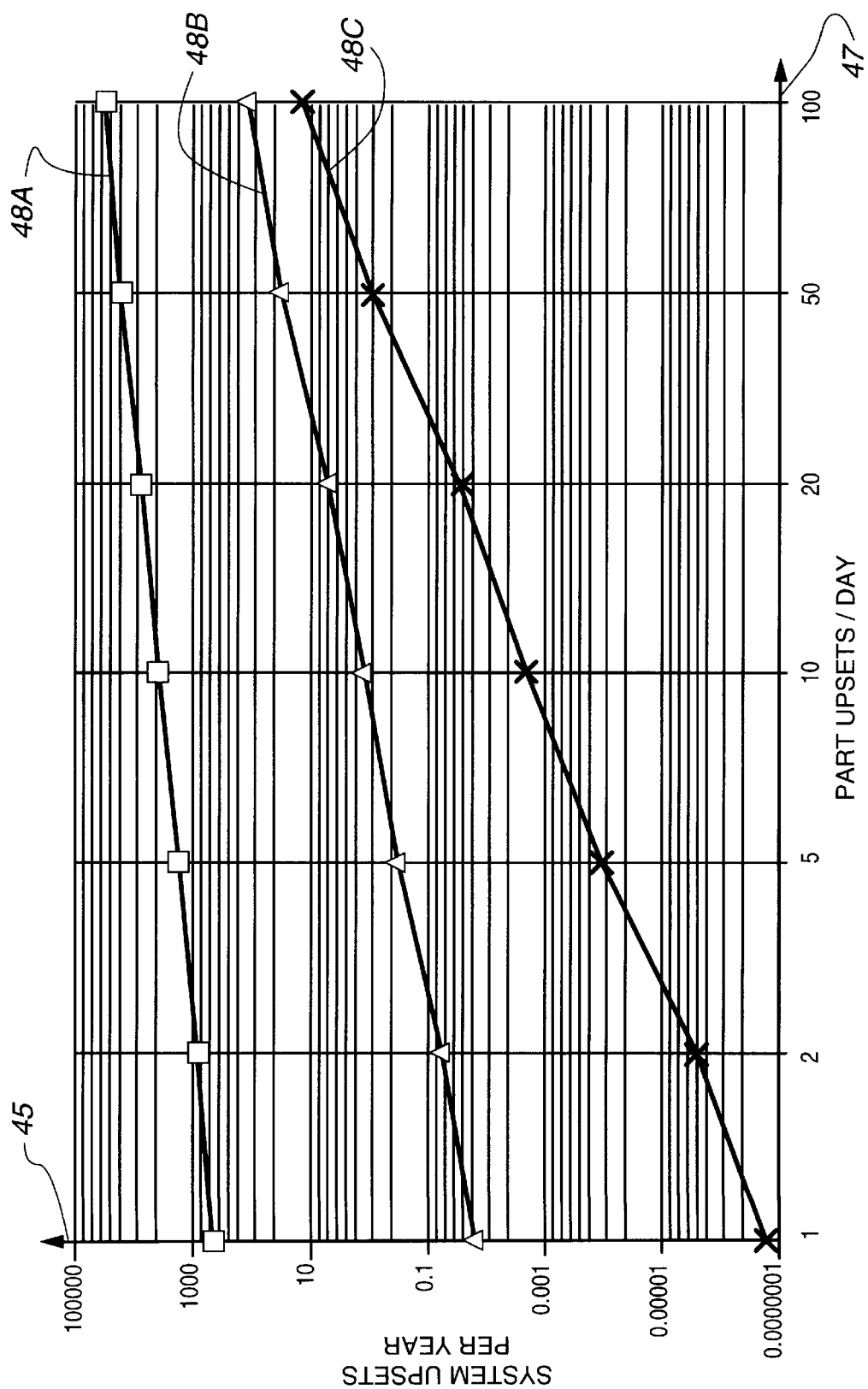

FIG. 4 is a chart which illustrates the number of system upsets per year versus the number of individual part upsets per day for a component whose output is not voted, for components compared by two of three votes, and for a component whose output is compared by two of four votes. The chart shows that system upsets are reduced for voting over non-voting of a component's output by many orders of magnitude.

Figure 5:
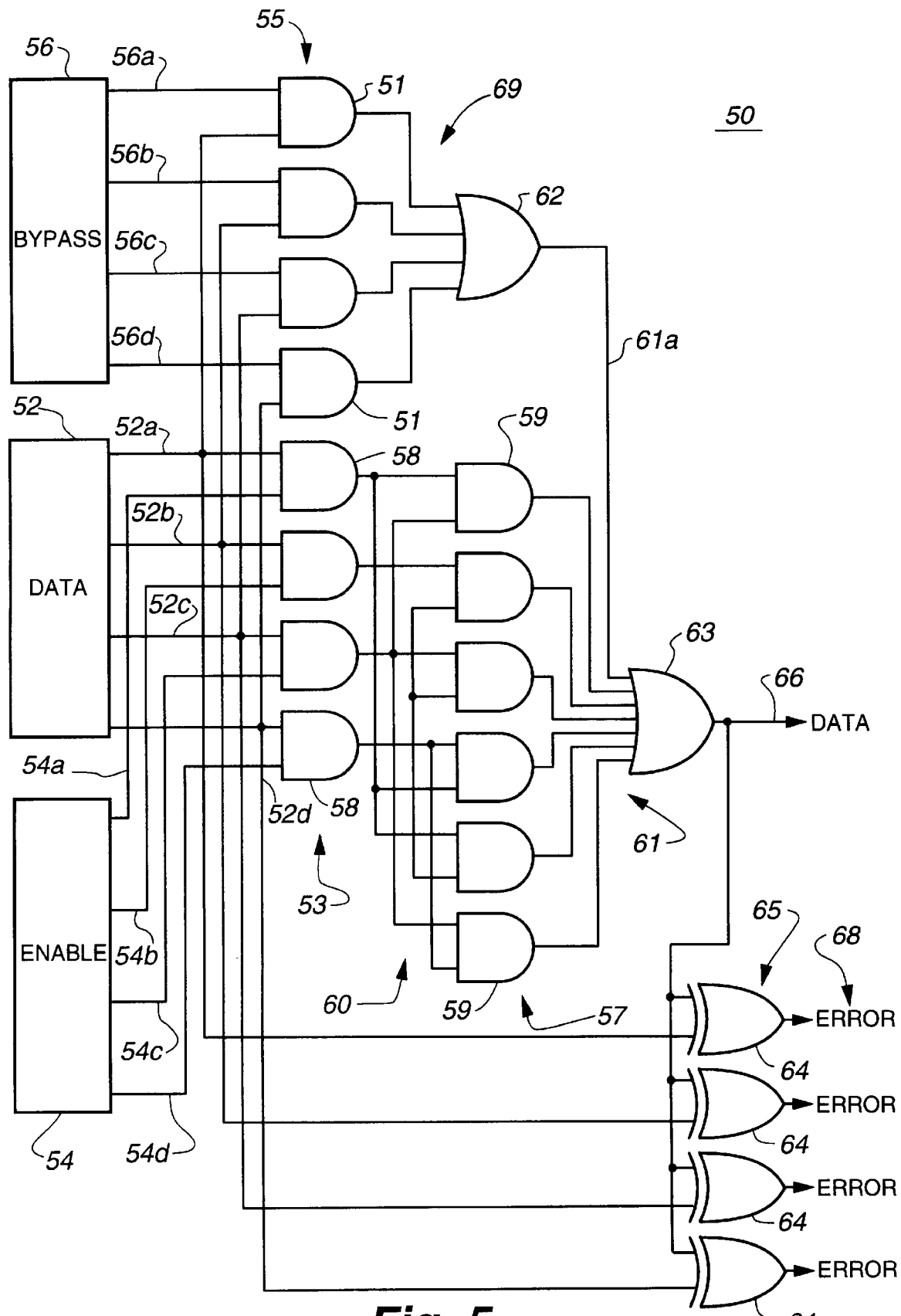

FIG. 5 is a schematic diagram of a typical circuit for voting one of several signals from a CPU, which implements the "quad voting" method illustrated in FIG. 3.

Figure 6:
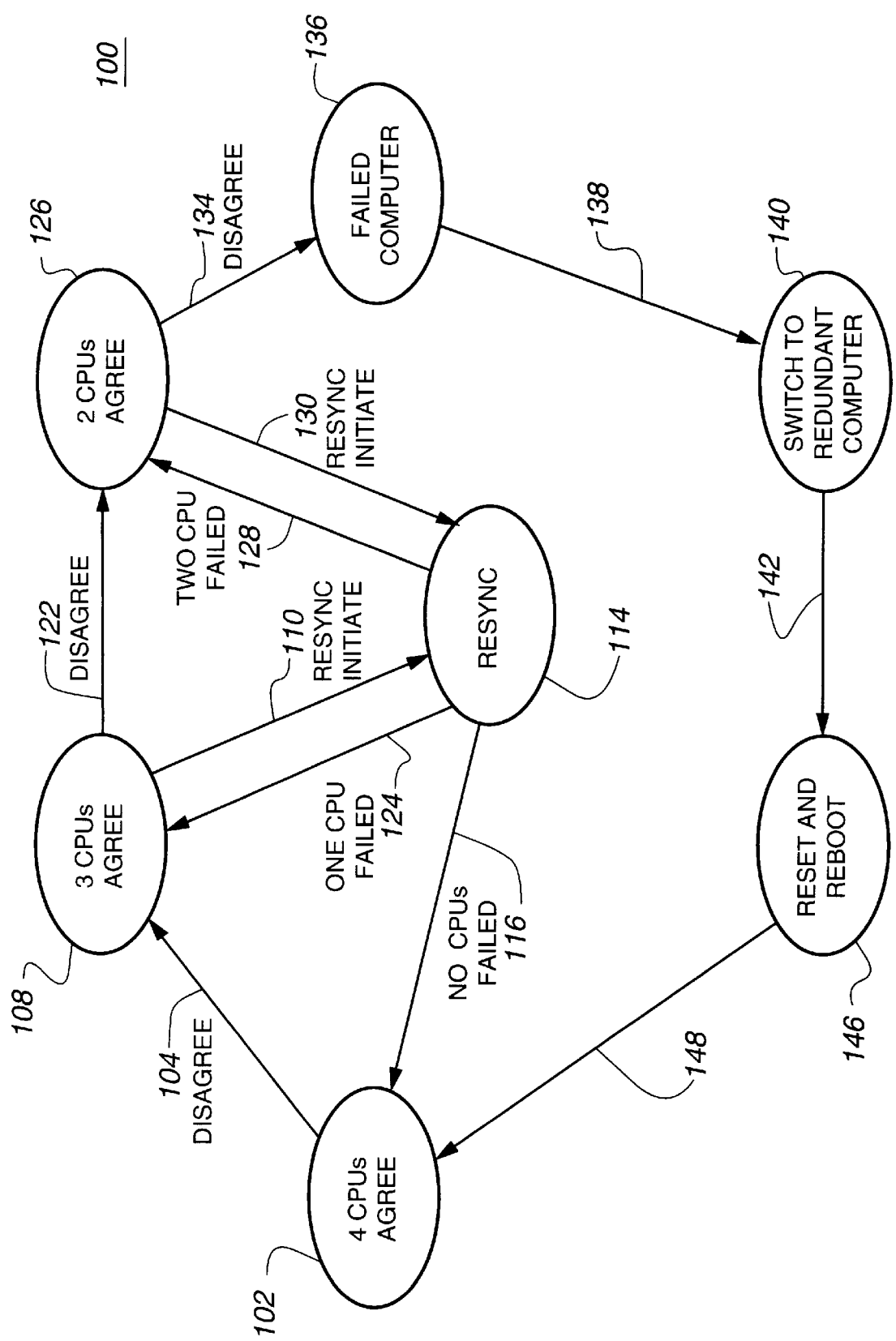

FIG. 6 depicts a state diagram of the instant invention showing system reaction to a fault detection and its correction.

Figure 7:
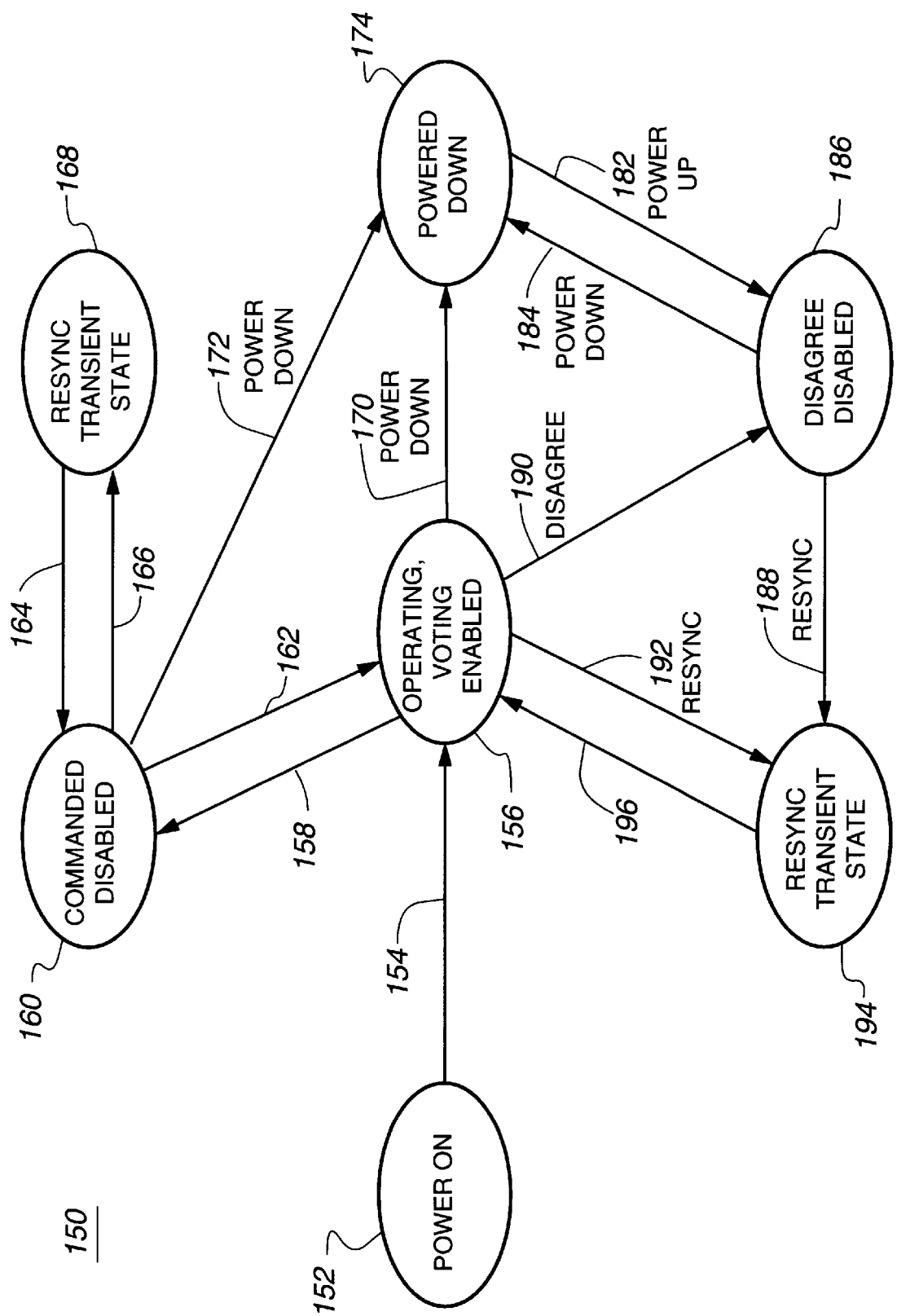

FIG. 7 is a CPU control state diagram which illustrates various power control states which implement error correction of an individual CPU by power removal and restoration.

Figure 8:
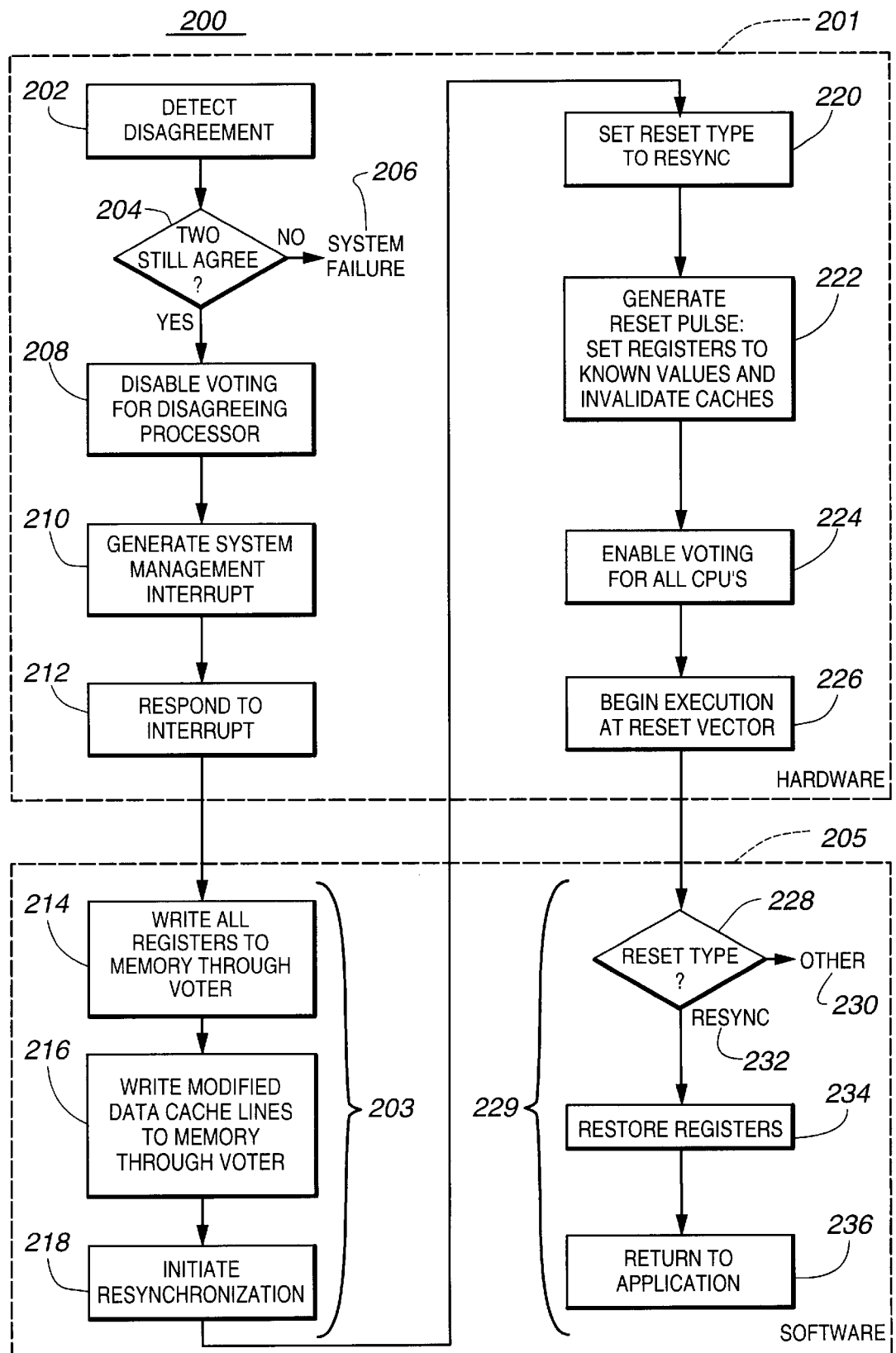

FIG. 8 depicts in flow chart form, the hardware and software actions which re-synchronize the CPUs and recover from an error.

Figure 9:
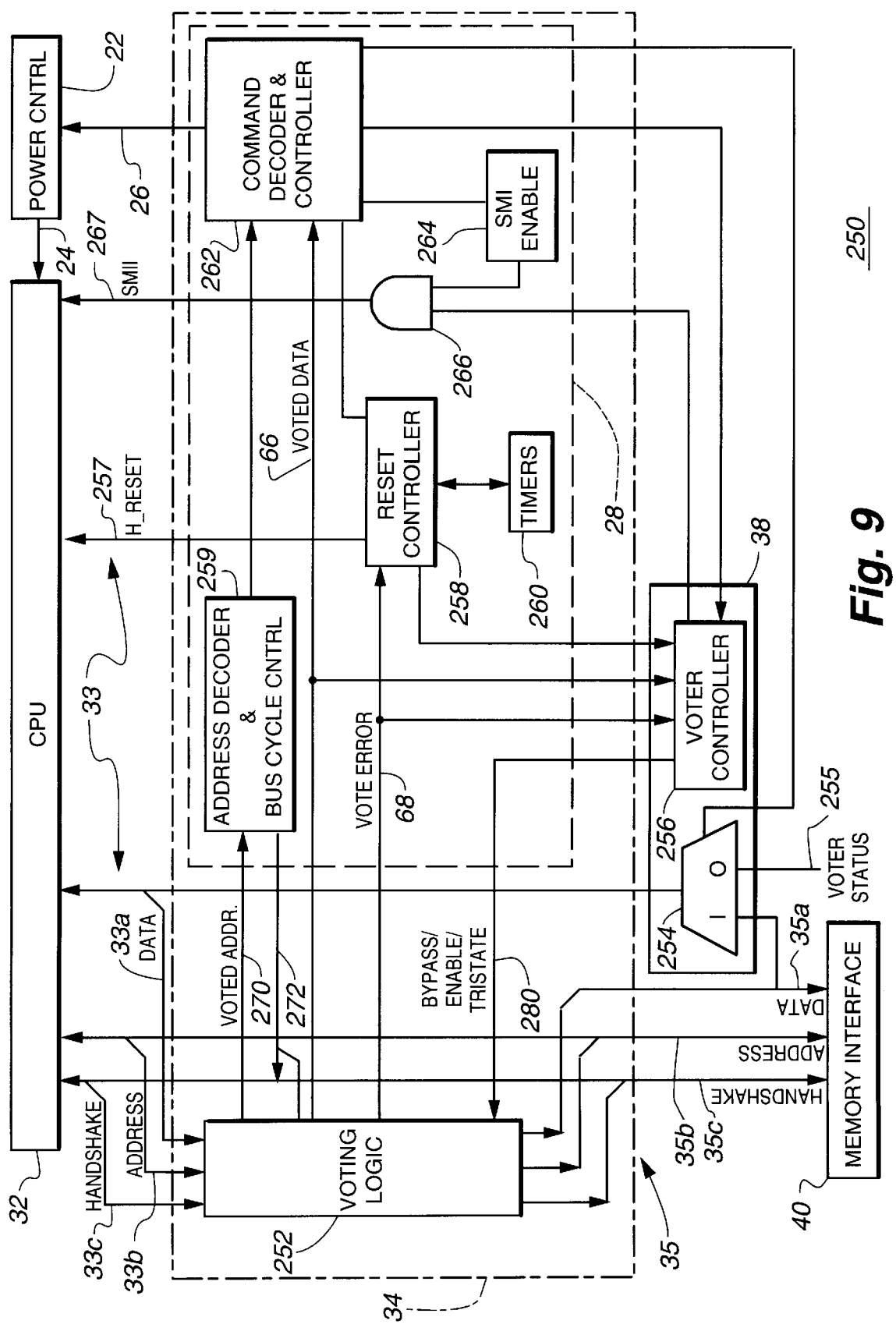

FIG. 9 is a block diagram of voter circuits which are used to control the supply voltage and condition the input signals to the CPUs.

Figure 10:
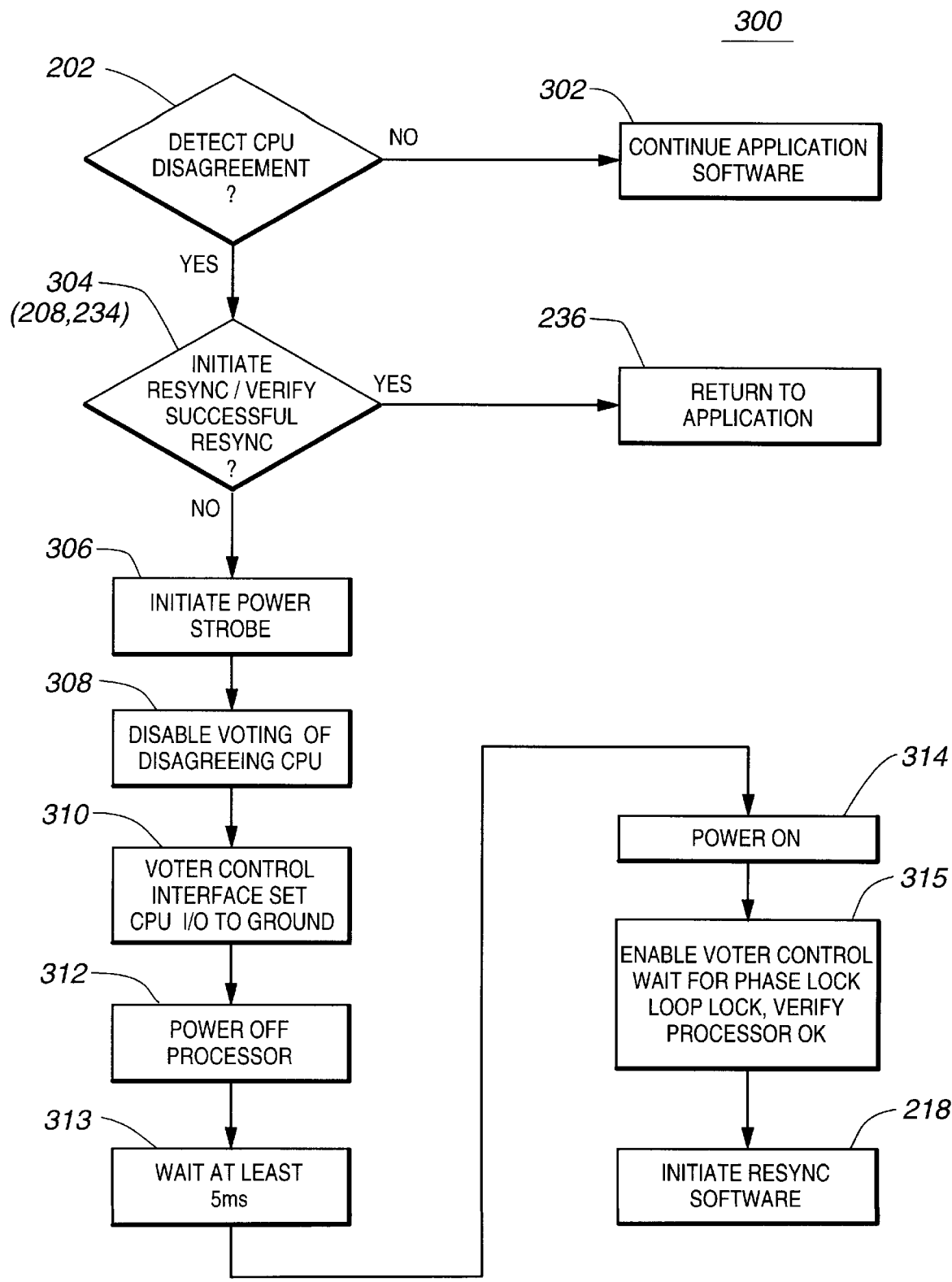

FIG. 10 is a flow diagram depicting the sequence of actions which remove and restore power to a disagreeing CPU.

A DETAILED DESCRIPTION OF PREFERRED & ALTERNATIVE EMBODIMENTS

Basic Architecture

Figure 1:
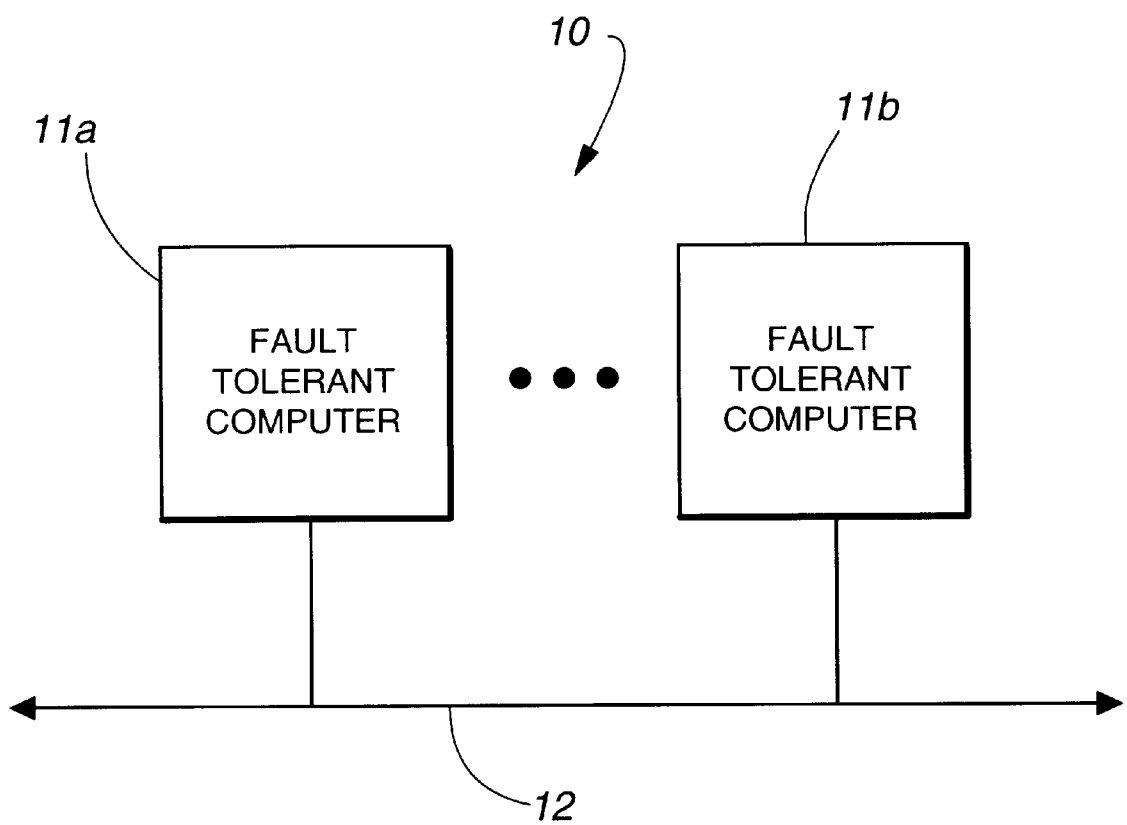

FIG. 1 presents a top level block diagram of computer system 10 which is designed to tolerate and to manage upsets of central processing unit (CPU) components within a first computer 11a. The first computer 11a provides data and control signals to a system (I/O) bus 12 for operating other devices or recording. The invention "masks" computer errors caused by radiation induced single event upsets (SEU). The design also tolerates faults, temporary or permanent, caused by trace radioactive materials (alpha particles) in semiconductor packages or caused by other events such as exposure to diagnostic or therapeutic medical equipment which employ X-rays. An SEU is a mis-stated output of a component of one or more signal bits. An upset does not necessarily indicate a component is faulty. Intermittent or hard failures indicate a faulty component which must be disabled or replaced. A second computer 11b is provided as a stand-by substitute for a disabled first computer 11a. When used in this Specification and in the claims, the term "fault" refers to any condition of a chip which is abnormal, including errors, failures or latchups. A destructive fault is one which, if not quickly corrected, would result in destruction of one or more circuit components.

Non-Intrusive Power Control

The present invention provides for the shutdown or power down of computer processors used in a redundant, fault tolerant, computer system, without failing the whole system. The power control system is non-intrusive, that is, a device can be powered on or off by hardware or software without affecting a running software application. A preferred embodiment uses redundant voting at the hardware clock level to detect and to correct errors caused by radiation-induced single event upsets (SEU). Voting at the hardware clock level refers to comparing for agreement, data and address signals of a plurality of central processing units at every clock cycle. A SEU can cause "latchup" of an electrical device. Correction of errors caused by device latchup usually involves the necessity to reduce or remove power to a processing unit or other component to prevent catastrophic damage because of excessive current. The cause of the latched condition may be only a temporary upset and when power is reapplied, the component functions as expected.

Typical CMOS components can not be powered off while their interface components remain powered. FIG. 2a presents a schematic diagram of a typical CMOS device 14 with signal voltage 16 and supply voltage ($V_{cc}$) 20 applied. A signal out 17 results. Inspection of this diagram reveals why it is necessary to condition the signal input 16 when power is removed from the CMOS device 14. Excessive voltage at the signal input 16 will destroy the thin gate oxide 19 even with protective "breakdown" diodes 18 across the signal input 16. A first diode 18 between signal input 16 and $V_{cc}$ 20, clamps the maximum signal input 16 voltage to the voltage drop across the diode 18 plus $V_{cc}$ 20. The voltage drop across diode 18 is typically about 0.7 volts. If $V_{cc}$ were set to ground potential, the signal input would be limited to about 0.7 volts. The diode 18 between signal input 16 and return/ground 23 will not allow a signal to be more negative than approximately −0.7 volts. To prevent excess current from over-stressing the device 14, the signal input 16 must be driven to ground potential if $V_{cc}$ is removed. If the return/ground 23 is instead removed, the signal input 16 must be driven toward $V_{cc}$. In this way, the current flow between signal input and ground or signal input and supply voltage ($V_{cc}$) bus 20 is minimal. Controlling the stress on a component 21 when power is interrupted by conditioning the signal input 16 voltage, prevents degradation of the component's reliability.

Figure 2B:
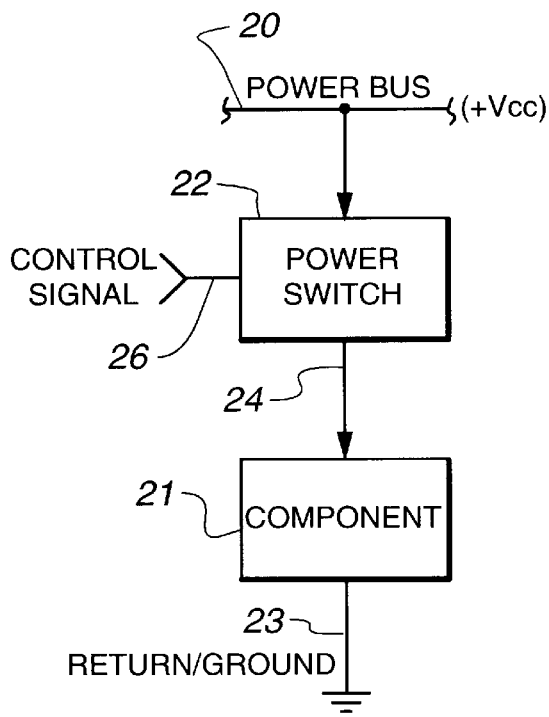
FIG. 2b is a schematic diagram depicting one preferred embodiment of switching power on and off to a computer system component, wherein the power is interrupted on the supply side of the component.
Figure 2C:
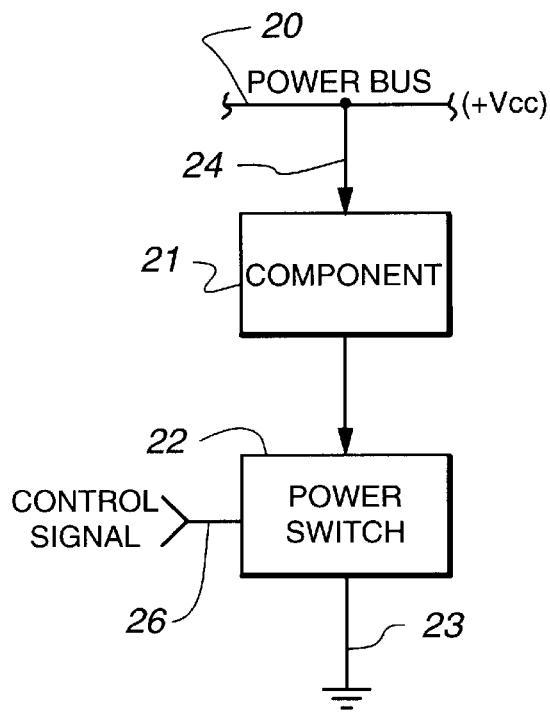
FIG. 2c is a schematic diagram depicting an alternative embodiment of switching power to a computer system component on and off, wherein the return/ground is removed from the component.
Figure 2A:
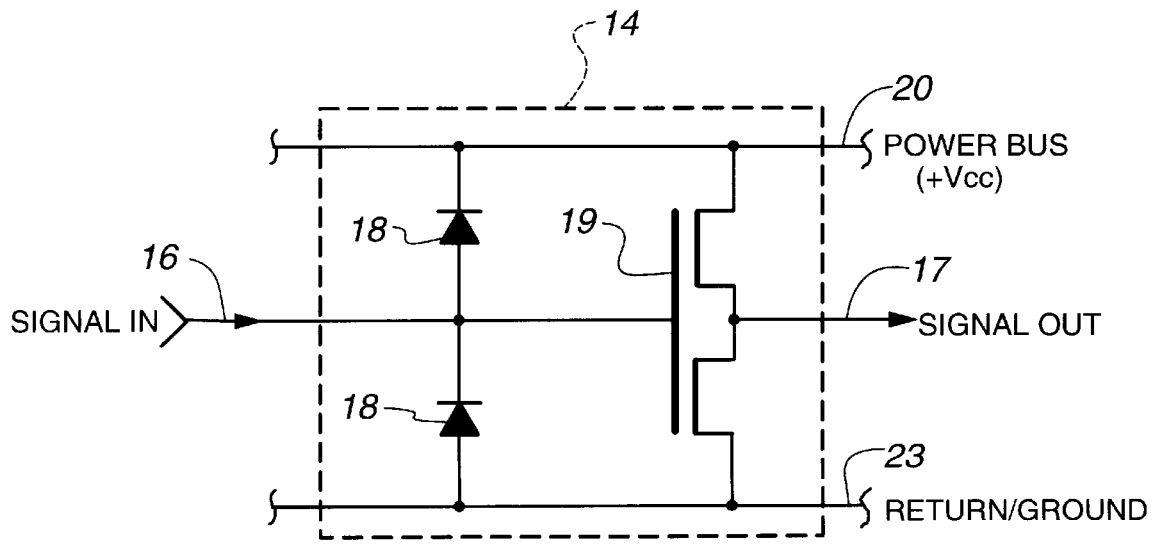

FIGS. 2b and 2c illustrate two methods of interrupting the power to a component. FIG. 2b shows a power switch 22 inserted in the power bus 20 ahead of the component 21, which when activated, removes $V_{cc}$ from the device. The power switch 22 is opened and closed by a control signal 26. FIG. 2c shows the power switch 22 placed between the component 21 and return/ground 23. The control signal 26 removes and replaces return/ground 23.

One Embodiment of the Present Invention

FIG. 3 shows further detail of an implementation of a preferred embodiment of the invention. In one preferred embodiment, the computer 11a has a plurality of four commercial CPUs 32 operating synchronously. However, the number of CPUs 32 utilized may vary upwards from at least three, depending upon the fault tolerance the user would find acceptable. The CPUs 32 shown in FIG. 3 are reduced instruction set computer chips (RISC). RISC chips are preferred since they contain high-speed memories and require less overhead than other usable CPU chips. The computer 11a includes a voter 34 which is depicted as implemented in an application specific integrated circuit (ASIC). In an alternative embodiment, the voter 34 may consist of field programmable gate arrays. The voter 34 is coupled to each of the CPUs 32. The voter 34 is coupled to a memory controller 36 which contains a vote status and control circuit 38. The memory controller 36 is shown as implemented in a separate ASIC from the voter 34. Although pin count limitations may result in two or more IC's for the voter 34 and memory controller 36, they both may be of a single design.

FIG. 3 also depicts a system memory 46 which receives voted CPU signals 35 through a memory interface 40. The voted CPU signals 35 also are also sent to the system computer (I/O) bus 12 through a bus interface 42. The memory 46 provides memory output signals 37a to the memory controller 36 through the memory interface 40. The memory output signals 37a are distributed equally as input signals 33i to each of the CPUs 32 through the memory controller 36 and the voter 34 via the CPU bus 35a. The "reads" from memory 46 are checked using conventional techniques. Well known "Hamming codes," implemented in the memory-chip hardware, can check and correct a single bit error and detect double bit errors.

Any CPU output signals 33o which do not agree with a majority of CPU output signals 33o are detected by the voter 34. An error signal 39b is then produced by the voter 34 and is sent to the vote status and control circuit 38. The majority voted signals 35 are used by the agreeing CPUs 32 to continue processing operations without interruption. The vote status and control circuit 38 reacts to the error signals 39b by generating a system management interrupt. At a later time, in reaction to the system management interrupt, software initiates re-synchronizing of the plurality of CPUs 32 when the error is caused by a single event upset. The vote status and control circuit 38 reacts to error signals 39b caused when a CPU 32 fails to agree with a majority, when less than three CPUs 32 are operable and less than two of the plurality of CPUs 32 agree, by substituting an error-free computer 11b. The dysfunctional computer 11a is powered down. A conventional control circuit named "reconfiguration unit," not shown in FIG. 3 for simplification purposes, accomplishes the switching procedure.

The output 33o from each CPU 32 is compared for agreement with the output 33 from all other CPUs 32 in the voter 34 each CPU clock cycle. Agreement of a majority of CPU output signals 33o supplied to the voter 34 results in a voted output signal 35 which has the value of the majority. The error signal 39b, sent to the vote status and control circuit 38 in the memory controller 36, causes several reactions:

1. If the CPU output signals 33o do not agree as a result of temporary upset, all of the CPUs 32 are re-synchronized by distributing the last-voted CPU internal state, equally to all CPUs 32.
2. If the CPU output signal 33o disagreement persists, indicating a possible latchup condition, then power is removed from the affected CPU 32.
3. If the CPU output signal 33o disagreement indicates temporary upset or permanent failure of a CPU 32 when only two CPUs 32 are operating, then a spare, error-free computer 11b is substituted, the system is reset (normally by setting all registers to zero) and rebooted.

The use of the methods and apparatus embodied in this invention are expected to correct the faults described without the need to resort to substitution of a spare computer.

In order to assure that all signals 33i are presented to all CPUs 32 on the same clock cycle, all signals 35 originating in other parts of the system are synchronized to the system clock in the voter 34 and are driven separately to each CPU 32. Such signals, for example, are resets and interrupts.

A CPU interface control 28 for each CPU is implemented in the voter 34 ASIC. Each CPU interface control 28 is connected to the bus on which the CPU output signals 33o are carried. The interface control 28 provides a control signal 26 to a power switch 22 by which supply voltage 24 from the power bus 20 is removed from the CPU 32 when a persistent output signal 33o error due to latchup is detected. The interface control 28 drives the signal inputs 33 to the CPU to a non-stressed condition when the supply voltage 24 is removed, as described above. The interface control 28 may also be commanded to remove supply voltage 24 for conservation purposes or if a failure is suspected, when needed.

FIG. 4 illustrates the number of system upsets that occur per year 45 versus the number of individual part upsets per day 47 for a component whose output is not voted 48a, for components compared by two of three votes 48b, and for a component whose output is compared by two of four votes 48c. For a given number of upsets per day, say 10, the chart shows that system upsets per year 45 are reduced for two-of-four components voted 48c over non-voting of a component's output 48a by about three orders of magnitude ($10^3$). Ten upsets per part per day result in only one system upset in about 500 years in a two-of-four voter system. Even a two-of-three voter system will exhibit system upsets only a few times per year for the same part upset rate. In the instant embodiment, four voting components are available unless one of the four CPUs 22 fails permanently. The 2 of 4 voting set starts out with four members, but degrades to a 2 of 3 set as soon an any member faults. A 0.5 second average time for re-synchronization has been used for the upset calculation, consistent with recovery within a one second major cycle time of a satellite control software system.

Fault Detection

Fault detection takes place in the voter 34. FIG. 5 depicts a typical circuit in the voter 34 which accomplishes the voting. A voter for data signals 54, derived from CPU output signals 33o is illustrated. A similar voter 34 is used to obtain voted address signals and handshake (control) signals, which are also derived from the CPU output signals 33o.

A gate array 50 includes a first AND gate array 53, a second AND gate array 57, a first OR gate 63 and an array of exclusive OR gates 65. The gates 53, 57, 63, 65 compare the CPU output signals 33o, present a voted output to the memory bus and I/O bus and detect an erroneous output from a CPU 32. The voter 34 may also include a bypass gate array 55, consisting of AND gates 51 and OR gate 62. The bypass gate array 55 is useful for testing the system and as an override of the voter 34 in the event it is desired to operate the system 10 when only one functional CPU 32 remains in operation.

Each first AND gate 58 of the first AND gate array 53 has as a first input 52a–d, a CPU output signal 33o which is a data signal 52. It has as a second input a vote status and control signal 39a which is an enable signal 54. Each first AND gate 58 has an output 60.

Each gate 59 of the second AND gate array 57 has as a first input, an output 60 from one gate 58 of the first AND gate array 53 and has as a second input, an output 60 from another gate 58 of the first AND gate array 53. Each second AND gate 59 has an output 61.

The first OR gate 63 has as input, the output 61 of each gate 59 of the second AND gate array 57, and the output 61a of the bypass gate array 55. It has an output 66.

Each gate 64 of the exclusive OR gate array 65 is coupled to the output 66 of the first OR gate 63. Each one of the exclusive OR gates 64 in the array 65 is coupled respectively to each of the data signals 52 and has an output 68.

The data signals 52, input to a first terminal of the first AND gate array 53, emerge as outputs 60 from the array 53 by application of a respective enable signal 54 to a second input terminal of a corresponding gate of the array 53. The outputs 60 are compared, one to another in the second AND gate array 57. Each of the outputs 61 from the second AND gate array 57 have a value of the data signals 52 which are in agreement. The output 66 from the first OR gate 63 has a value of the data signals 52 which emerge as outputs 61 from the second AND gate array 57.

The output 66 from the first OR gate 63 is applied to a first input of each gate 64 of the exclusive OR gate array 65. The data signals 52 are applied, respectively to a second input of each gate 64 of the exclusive OR gate array 65. An error signal 68 indicating an upset or fault is output from each gate 64 of the exclusive OR gate array 65 when the applied data signal 52 and the applied output 66 from the first OR gate 63 do not agree.

As FIG. 5 shows, each CPU output signal 33o appearing as a data signal 52, can be bypassed around the voting process by applying a bypass signal 56 to one terminal of a gate 51 in the bypass gate array 55. The data signal can be excluded from voting, that is disabled, by removing the enable signal 54 from the input 54a–d to its respective gate. If only one CPU 32 is enabled, and the rest are disabled, then the voter data output 66 will follow that bypassed CPUs output 33b. If more than one CPU 32 is enabled, then the data output 66 will be the logical OR of all bypassed CPU outputs 33b. If a CPU 32 is both bypassed and disabled, then its output 33b will be presented to the OR gate 63. Similar bypassing takes place for address signals at the same time.

Fault Correction

Compared to an "unvoted" part or component, a voting set of three CPUs 32 can give correct outputs even if one of the members has been upset and is not working correctly. While in this condition in which one of three CPUs 32 is not working, an upset of one of the other two CPUs 32 will result in a system upset, since a majority vote must be unanimous if there are only two valid voters. Once a CPU 32 is upset, it may continue to behave differently than the other CPUs, 32 due to the complexity of the internal machine state. To restore a faulted CPU 32 to the voting set requires a re-synchronization. The system upset level depends on both the upset rate of individual CPUs 32, and the average length of time before a re-synchronization is initiated.

The diagram of FIG. 6 illustrates the system logic. CPU states are shown in the closed boxes. Transitions from one state to another are depicted by the lines, the arrow heads indicating the direction of the transition. The computer 11a begins in a state of "four CPUs agree" 102. If one CPU output 33b is in disagreement with the other three CPUs 32, then an error signal indicating disagreement is generated by the voter 34 as described above. The computer 11a transitions 104 to "three CPUs agree" 108.

When the computer 11a transitions 104 to state 108, an interrupt is generated to the CPUs 32 requesting that a re-synchronization be performed. From the "three CPUs agree state" 108, the computer 11a transitions 110 through the "re-synchronization state" 114. The computer 11a then transitions 116 to state 102, transitions 124 to state 108, or transitions 128 to state 126, depending on how many CPUs 32 have either failed permanently or are unpowered and cannot be brought into agreement during the "re-synchronization state" 114.

While the computer 11a is in the "three CPUs agree state" 108, if a disagreement is detected among the three voting CPUs 32, then the disagreeing CPU 32 is disabled and the computer transitions 122 to "two CPUs agree state" 126. When in transition 122 to state 126, a system management interrupt is generated to the CPUs 32 requesting that re-synchronization be performed. From "two CPUs agree" state 126, the transition 130 through re-synchronization 114 will return the computer 11a to state 102, 108, or 126, depending upon how many of the CPUs 32 have failed permanently or are unpowered and cannot be brought into agreement during the "re-synchronization state" 114.

While the computer is in "two CPUs agree state" 126, should a disagreement be detected among the two voting CPUs 32, the computer 11a will transition 134 to a "failed computer state" 136. Upon reaching the "failed computer state" 136, the computer 30 indicates a failed condition to the reconfiguration unit and a transition 138 is made to "switch to an error-free redundant computer state" 140. The switch being made, the error-free, redundant computer 11b is reset (normally all registers go to zero) and the system 10 is rebooted. The substitute computer 11b then transitions 148 to a "four CPUs agree" state 102.

CPU State Control

Individual CPUs 32 can be in any one of the following states:

1. Enabled and voting;
2. Commanded disabled;
3. Disagreeing, disabled;
4. Bypassing;
5. Re-synchronizing; or
6. Power down.

An application specific integrated circuit (ASIC) voter 34 supports a powered down CPU 32 by insuring that interface pins to the CPU 32 are driven to a non-stressed condition. The vote status and control circuit 38 prevents direct movement from a power down state to an enabled and voting state by always placing a CPU in the disagree, disabled state when leaving the power down state.

The CPU control and status signals 39a, 39b generated during operation of the computer 11a are:

1. Error signal 68 from the voter 34, one for each CPU 32;
2. Enable signal 54, bypass signal 56, CPU input "tristate" signal (all inputs driven to ground) to the voter 34 from the vote status and control circuit 38, one for each CPU;
3. System management interrupt and reset signals to each CPU 32 from the vote status and control circuit 38; and
4. Power control signal (on or off) 26 from the interface control 28.

Both the interrupt and reset signals pass through the voter 34 for clock synchronization. The static state of control signals for each CPU 32 state is shown in Table One:

TABLE One

CPU State Control Signals

| State | Enable | Bypass | Reset | Power |
| --- | --- | --- | --- | --- |
| Enabled and voting | Enabled | Off | Inactive | On |
| Commanded Disabled | Disabled | Off | Inactive | On |
| Disagreed, Disabled | Disabled | Off | Inactive | On |
| Bypassing | — | On | Inactive | On |
| Powered Down | — | — | — | Off |
| Re-synchronizing | — | — | Active | On |

FIG. 7 is a CPU state control diagram 150 which shows the various states of an individual CPUs 32 when powered on, disabled by command or by an upset and the transitions from one state to another. In this diagram, CPU states are shown in closed boxes and transitions from one state to another are depicted as lines. The direction of the transition is shown by the arrowheads. The cycle begins with a power on command 152. Each CPU 32 in the computer 11a then transitions 154 to the "voting and enabled state" 156. Each CPU 32 in the computer 11a may be disabled by command from the software by transition 158. The disable command is performed to ensure that an erring CPU does not participate in a voting operation. The "commanded disabled state" 160 may be reversed by transition 162. From the "commanded disabled state" 160 the CPUs may be re-synchronized and return to the "commanded disabled state" 160, as indicated by the transitions 166, 164 to and from the "re-synchronize state" 168.

A CPU may be moved via transition 170 to a "powered down state" 174 from the "voting and enabled state"156 or via transition 172 from the "commanded disabled state" 160. A CPU 32 may be powered down by transition 184 from a "disagree, disabled state" 186. The powered down state may be used to conserve power for long missions or low bus power. This state may be useful for conserving power aboard a satellite when solar flare activity is relatively low and the number of upsets encountered is diminished. If power is at a premium, reduction of power may be preferable to full fault tolerance. The computer 1 a may also be disabled when a permanent failure is recognized or suspected. The "disagree, disabled state" 186 is achieved by transition 190 from the "operating, voting enabled state" 156, caused by an error signal 68 resulting from an upset. If the upset CPU 32 can be restored to operation, a transition 188 to the "re-synchronize transient state" 194 is made. The CPUs 32 are re-synchronized and returned to the "operating, voting enabled state" 156 by transition 196. When a CPU 32 has failed to re-synchronize after a disagreement and a subsequent re-synchronization, a latchup is suspected. Power is then removed and reapplied to the CPU 32 to clear the latchup. From the "powered down" state 174, a CPU 32 can be restarted by a power up transition 182 through "the disagree, disabled state" 186.

Re-synchronize Operation

The re-synchronize operation 194 is commanded by software running in the CPUs 32. When the command is received, all CPUs 32 are temporarily placed in "reset". Any CPUs 32 that are in the "disagree, disable state" 186 (with respect to voting) are returned to the "operating, voting enabled state" 156. If a CPU 32 was "commanded disabled" 160 (or in bypassing state) it remains in that condition after the "re-synchronize transient state" 168. This process is described in more detail in the discussion of FIG. 8 below.

CPU Reset

When power is first applied 152 to the computer 11a, all CPUs 32 are powered, operating and voting enabled 156. When a CPU transitions 190 to a "disagree, disabled state" 186, a system management interrupt (SMI) is generated in the vote status and control circuit 38 and sent to the CPU 32. The SMI begins a re-synchronization sequence. An interrupt service software program initiates a transition 188 to a re-synchronization operation 194.

Error Correction by Re-synchronizing the CPUs

FIG. 8 is a flow 200 chart which portrays the hardware and software actions which re-synchronize the CPUs 32. A portion of the process takes place in hardware 201, principally the CPU 32, the voter 34 and vote status and control circuit 38. The other operations are controlled by software 205 running in the CPUs 32. The error correction process begins when a disagreement of a CPU 32 with the majority of other CPUs 32 is detected by the voter 34. If no two operating CPUs 32 agree 204, the system is considered to have failed 206. In such event, a system restart with a substituted spare computer 11b will be attempted. All software will be restarted, but a major disruption of computer ftinctions will occur.

If an error is detected, and two or more CPUs 32 still agree 204, the disagreeing CPU 32 is disabled 208 from participating in voting. A system management interrupt (SMI) is generated 210 by the hardware. The SMI generates a flag indicating re-synchronization will be needed shortly, though not immediately. The application software program continues without interruption. Disabling the disagreeing CPU 32 avoids corruption of the voting process, allowing detection of any additional upsets or failures in the remaining CPUs 32. Shortly thereafter, as determined by the interrupt enable and priority settings of the CPUs 32, the system responds 212 to the system management interrupt 210. As part of this response 212, the software status, including the point at which the currently executing program was interrupted, is saved to the memory 46. This information is used later to resume the interrupted program at the exact point at which it was terminated.

The interrupt service software program 203 will write 214 all of the CPU registers to memory 46 through the voter 34. Since at least two CPUs 32 agree, the registers contain correct values and the saved values will be error-free. During the re-synchronizing process, these values will be reloaded into all the CPUs 32, replacing any erroneous values in the disagreeing CPU 32. The interrupt service software program 203 will force any locations in the data cache that were modified by the CPU 32, but not yet written into memory 46 through the voter 34, to be written 216 into memory through the voter 34. If various CPUs 32 have different values in their caches, the voting process assures that the memory 46 has only correct values.

The interrupt service software program 203 then initiates re-synchronization 218 and begins a hardware sequence. First, as shown in FIG. 8, the reset type is set 220, to re-synchronization and the reset-type information is held in a dedicated register. Other reset types, include majority fail, power up and external signal. Second, a reset pulse is generated 222 and sent to all CPUs 32. Within each CPU 32, the reset pulse causes the registers in all CPUs 32 to be set to the same value, usually zero. The reset pulse also causes the contents of all CPU caches to be discarded. New data must be read from memory 46 before the CPU caches can be used. Voting is then enabled 224 for all CPUs 32 that were disabled 208. Finally, after all the reset functions are complete, all CPUs 32 have the same machine state and are operating identically once more. The CPUs 32 begin program execution 226 from a special address called a reset vector.

The reset service software 229 that resides at the reset vector address looks at the reset type register and determines 228 the type of reset that occurred. Because in the example, the reset type was set 220 to indicate re-synchronization 232 of the CPUs 32, the software 229 will reload the CPU register data, written previously to memory 46, into the CPU registers. All CPUs 32 receive the same value since the voting process allowed only one set of values to be saved to memory 46. The information which characterizes the machine state at the time the system was interrupted is restored 234 to the registers. Reset service software 229 executes a "return from interrupt" process which returns 236 the original application program to the point at which it was interrupted.

The CPU caches whose contents were discarded by the reset pulse fill with new data as the program proceeds. Because of their dynamic nature, the cache contents may not be the same as if there had been no disagreement, but the caches in all CPUs 32 will be identical.

Other than the time delay needed for the re-synchronization process, the original application program is not affected in its operation or results by the disagreement and subsequent re-synchronization process.

Error Correction by Cycling Supply Power to the CPUs

FIG. 9 presents a block diagram of the power control system. Circuits are depicted which are used to control the supply voltage ($V_{cc}$) and condition the input signals 33i to the CPUs 32. FIG. 9 shows a more detailed view of the voter 34 and vote status and control circuit 38. Further constituents: a voting logic 252 which comprises a plurality of gate arrays 50; a voter control circuit 256; and a voter status circuit 254 are depicted. Only one CPU 32 and one power switch 22 are shown in FIG. 9 for clarity, however, the reader should understand that in a preferred embodiment at least four CPUs 32 and power switches 22 are coupled as is shown in FIG. 3. The interface control 28, which in a preferred embodiment resides on the voter 34 chip, includes a reset control 258 and associated timers 260, an address decoder and bus cycle controller 259, a command decoder and controller 262, a system management interrupt gate 266 and its enable flip-flop 264. The CPU input 33i and CPU output 33o are carried on bidirectional data, address and handshake (known also as control) buses 33a,b,c. Voted outputs are carried on buses 35a,b,c. As described earlier, the CPU outputs 33o and CPU inputs 33i carried on these buses 33a,b,c are voted each CPU clock cycle.

The command decoder and controller 262, is a major element of the interface control 28. It is disposed on the path from the voting logic 252 to system memory 46 via the memory interface 40. Voted data 66 which is to be written to system memory 46, also passes to the command decoder and controller 262. The command decoder and controller 262 distributes commands derived from voted data signals 66, voted address signals 270 and voted handshake signals 272. During operation, when at least two CPUs 32 are in agreement, the voted data 66 is passed through the voter status circuit 254 to be written to memory 46. Voter error signals 68 pass to the voter control circuit 256. The voter control circuit 256 supplies a bypass/enable/tristate signal 280 which turns off the voter enable signal 54 in the voting logic 252 to a disagreeing CPU 32. The disagreeing CPU 32 is then precluded from participating in voting. The re-synchronization process, described above, begins when a voter error signal 68 is received by the voter control 256 which generates a system management interrupt (SMI) 267 through the SMI gate 266. The SMI gate 266 is enabled by a pulse from an SMI enable flip-flop 264, triggered by the software and enabling a command from the command decoder and controller 262. The reset control 258 issues a reset pulse (H_Reset) 257. The timers 260 ensure that after the reset pulse 257, the reset controller 258 waits an appropriate time for the reset CPUs 32 to perform hard reset operation before relinquishing control to the voter logic 252. If the re-synchronization is successful and the upset CPU 32 is restored to synchronism with the other CPUs 32, the system 10 returns to continue running the current application. If, however, the system 10 is not successfully re-synchronized, the software initiates the power strobe functions. In an alternative embodiment, timing sequences are controlled by software.

FIG. 10 is a flow diagram which depicts the software and hardware sequence which turns off and restores power to a disagreeing CPU 32. The sequence begins with detection of CPU 32 disagreement 202. Of course if no errors are detected, the currently running software application continues 302 without interruption. If a disagreement is detected 202, the re-synchronization sequence 304 is initiated as shown in FIG. 8, steps 208 to 234. If successful re-synchronization is verified 304, the system 10 returns to the current application. If this is not the case, as indicated by continued disagreement of a CPU 32, the power strobe sequence 306 starts. First, the disagreeing CPU 32 is disabled from voting 308. Next, the voter controller 256 sends a tristate signal 280 which operates 310 to set the CPU input/output 33o, 33i to ground potential to prevent damage to the CPU components. Immediately following that step, a signal 26 from the command decoder and controller 262 operates the power switch 22 and the supply voltage 24 is removed 312 from the disagreeing CPU 32. A time delay of at least five milliseconds ensues 313, after which the supply voltage 24 is restored 314 to the CPU 32. The voter 34 is then enabled 315 by the voter control 256 which operates to supply the enable signal 54 to the appropriate gates 53 of the voter gate array 50. Timers 260 allow the CPUs 32 to resume phase lock 315 after the reset pulse. Finally, when phase lock is verified 315, the re-synchronization cycle (refer to FIG. 8) is begun 218 and if successful, the current application resumes operating.

As previously described, should re-synchronization at this stage fail with only two CPUs 32 still active, the first computer 11a is deemed to have failed and the redundant computer 11b is powered up and substituted.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the claims that follow. The various circuits and components that have been disclosed above are intended to educate the reader about preferred embodiments, and are not intended to constrain the limits of the invention or the scope of the claims. The List of Reference Characters which follows is intended to provide the reader with a convenient means of identifying elements of the invention in the Specification and Drawings. This list is not intended to delineate or narrow the scope of the claims.

What is claimed is:

1. A non-intrusive power control apparatus comprising:
   a plurality of central processing units (CPUs) (32) operating a running software application synchronously, each operating step of each of said plurality of CPUs (32) being accomplished in parallel and substantially simultaneously with each of the other of said plurality of CPUs (32) each clock cycle of said CPUs (32), each one of said plurality of CPUs (32) having an input (33i) and an output (33o);
   a voter (34) having a voted output (35); said voter (34) coupled to each of said plurality of CPUs (32) and receiving said CPU output (33o); said voter (34) using redundant voting of said CPU output (33o) to detect a fault in any of said plurality of CPUs (32) whose output (33o) disagrees with CPU output (33o) of a majority of said plurality of CPUs (32); each said CPU output (33o) being compared one with another by said voter (34) each said clock cycle;
   a power bus (20) for furnishing a supply voltage (24) to each of said plurality of CPUs (32), said power bus (20) connected to each one of said plurality of CPUs (32); and
   said supply voltage (24) being removed from an affected CPU (32) and said CPU input (33i) being limited to non-stressed condition for said affected CPU (32) without terminating said running software application, when a potentially destructive fault is detected by said voter (34) in said affected CPU (32).

2. An apparatus as claimed in claim 1, in which said CPU input (33i) is limited by placing it at ground potential to prevent damage to said CPU (32) when said supply voltage (24) is removed from said CPU (32).

3. An apparatus as claimed in claim 1, in which said CPU input (33i) is limited by removing return/ground (23) from said affected CPU (32) and placing said CPU input (33i) at said supply voltage.

4. An apparatus as claimed in claim 1, in which said plurality of CPUs (32), numbers at least three.

5. An apparatus as claimed in claim 1, in which said plurality of CPIJs (32) are reduced instruction set CPUs (RISC).

6. An apparatus as claimed in claim 1, further comprising:
   a power switch (22) electrically interposed between said power bus (20) and each one of said plurality of CPUs (32); said power switch (22) coupled to said interface control (28) and receiving a signal (26) therefrom;
   said power switch (22) being capable of connecting and removing said supply voltage (24) to each one of said plurality of CPUs (32) upon receiving said signal (26) from said interface control (28); and said interface control (28) reacting to said fault in one of said CPUs (32) by providing said signal (26) to said power switch (22), said supply voltage (24) being removed thereby and simultaneously said CPU input (33i) being adjusted to prevent damage to said CPU (32); said running software application being permitted to continue in operation.

7. An apparatus as claimed in claim 6, further comprising:

a system bus (12);

a first computer (11a); said first computer (11a) including said plurality of CPUs (32), said voter (34), said interface control (28), said power switch (22) and said couplings; said first computer (11a) coupled to said system bus (12);

said first computer (11a) further including
a system memory (46);
a memory controller (36); said memory controller (36) coupled to said voter (34), said memory (46) and said system computer bus (12);

a second computer (11b); said second computer (11b) being substantially identical to said first computer (11a);
said second computer (11b) being coupled to said system bus (12) and maintained as an error-free replacement for said first computer (11a);

said system memory (46) providing memory output signals (37a) to said memory controller (36); said memory output signals (37a) being distributed equally as said CPU input (33i) to each of said plurality of CPUs (32), through said memory controller (36) and said voter (34);

agreement in said voter (34) of a majority of said CPU outputs (33o) resulting in said voted output signal (35) having a value of said majority of said CPU outputs (33o); and disagreement of any said CPU output (33o) with a majority of said CPU outputs (33o) being detected by said voter (34), an error signal being produced thereby; said error signal prompting re-synchronizing (130) of said plurality of CPUs (32) in said first computer (11a).

8. An apparatus as claimed in claim 7, in which disagreement of said CPU outputs (33o) being supplied to said voter (34) when less than two of said plurality of CPUs 32 are without error, results in said second computer (11b) being substituted for said first computer (11a).

9. An apparatus as claimed in claim 7, in which said re-synchronizing (130), said supply voltage (24) being removed and said CPU input (33i) limiting is controlled by software (205) run by said plurality of CPUs (32).

10. An apparatus as claimed in claim 7, in which agreement of less than two of said CPUs (32) results in said second computer (11b) being substituted for said first computer (11a).

11. An apparatus as claimed in claim 10, in which each one of said plurality of CPUs (32) is in one of the following stable states: enabled and voting; commanded disabled; non-agreement and disabled; bypassed; and powered down.

12. An apparatus as claimed in claim 7, in which a failure of two of said plurality of CPUs (32) results in said second computer (11b) being substituted for said first computer (11a).

13. The apparatus (10) as claimed in claim 1, in which said plurality of CPUs (32) are commercial non-radiation hardened chips.

14. A non-intrusive power control apparatus comprising:

a first computer (11a) having a plurality of central processing units (CPUs) (32) operating in synchronism running a software application, each operating step of each of said plurality of central processing units (32) being accomplished in parallel and substantially simultaneously with each of the other of said plurality of CPUs (32) each CPU clock cycle; each of said plurality of central processing units (CPUs) (32) having an input (33i) and an output (33o);

a bi-directional system bus (12);

said computer (11a) further including
a voter (34); said voter (34) having an interface control circuit (28) and having a voted output (35);
said voter (34) being radiation tolerant;
a memory (46);
a memory controller (36) having a vote status and control circuit (38),
a memory interface (40) and a system bus interface (42);
said voter (34) being coupled to said bidirectional system bus (12) through said system bus interface (42);
said memory controller (36) being coupled to said voter (34), coupled to said system bus (12) through said system bus interface (42), and coupled to said memory (46) through said memory interface (40);
said memory (46) providing memory output signals (37a) to said memory controller (36); said memory output signals (37a) being distributed equally as CPU input (33i) to each of said plurality of CPUs (32) through said memory controller (36) and said voter (34);

each of said plurality of CPUs (32) providing said CPU output (33o) as input to said voter (34) for comparison; said CPU outputs (33o) being compared by said voter (34); said voted output (35) being provided by said voter (34) as input (37b) to said system memory (46), said vote status and control circuit (38) and to said system bi-directional bus (12);

a second, error-free computer (11b) substantially equivalent to said first computer (11a);

agreement of a majority of said CPU outputs (33o) supplied to said voter (34) resulting in said voted output (35) having a value of said majority of said CPU output signals (33o);

said CPU outputs (33o) which do not agree with a majority of all said CPU outputs (33o) being detected by said voter (34); said voter producing error signals (68) thereby; said error signals (68) being sent as input (39b) to said vote status and control circuit (38);

said vote status and control circuit (38) reacting to said error signals (68) by prompting re-synchronizing of said plurality of CPUs (32);

said vote status and control circuit (38) reacting to said error signals (68) by prompting said interface control circuit (28) to remove said supply voltage (24) from an affected said CPU (32) and to limit said CPU input (33i) to near-ground potential without terminating said running software application when persistent said disagreement indicates a potentially destructive fault condition in said affected CPU (32); and said vote status and control circuit (38) reacting to said error signals (68) by substituting said error-free second computer (11b) for a dysfunctional said first computer (11a) when less than two of said plurality of CPUs (32) is without error.

15. An apparatus as claimed in claim 14, in which said plurality of CPUs (32) numbers at least three.

16. An apparatus as claimed in claim 14, in which said plurality of CPUs (32) are commercial non-radiation hardened chips.

17. An apparatus as claimed in claim 14, in which said plurality of CPUs (32) are reduced instruction set CPUs (RISC).

18. An apparatus as claimed in claim 14, in which each of said plurality of CPUs (32) is in one of the following stable states: enabled and voting; commanded disabled; disagreeing and disabled; bypassed; and powered down.

19. A method of non-intrusive power control comprising the steps of:

operating a plurality of central processing units (CPUs) (32) running a software application synchronously, each operating step of each of said plurality of CPUs (32) being accomplished in parallel and substantially simultaneously with each of the other of said plurality of CPUs (32) each clock cycle of said CPUs (32); each one of said plurality of central processing units (CPUs) (32) having an input (33i) and an output (33o);

connecting a power bus (20) to each one of said plurality of CPUs (32) and furnishing a supply voltage (24) to each of said plurality of CPUs (32) from said power bus (20);

coupling an interface control circuit (28) to said plurality of CPUs (32) and to said power bus (20); said interface control circuit (28) receiving said CPU output (33o) and providing said CPU input (33i);

coupling a voting logic (252) to each of said plurality of interface control circuits (28), receiving said CPU output (33o) and providing said CPU input (33i) with said voting logic (252);

comparing each said CPU output (33o) one with another in said voting logic (252) each said clock cycle and obtaining a voted output (35) from said voting logic (252);

detecting faults in each of said plurality of CPUs (32) whose output (33o) disagrees with CPU output (33o) of a majority of said plurality of CPUs (32), using redundant voting in said voting logic (252); and removing said supply voltage (24) from a disagreeing one of said plurality of CPUs (32) and adjusting said CPU input (33i) of said disagreeing CPU (32) to ground potential with said interface control circuit (28) when potentially destructive said faults are detected in said one of said plurality of CPUs (32) by said voting logic (252); and limiting said CPU input (33) with said interface control (28) to prevent damage to said CPU (32) when said supply voltage (24) is removed from said CPU (32) without terminating said running software application.

20. A method as claimed in claim 18, further comprising the steps of:

interposing electrically a power switch (22) between said power bus (20) and each one of said plurality of CPUs (32); coupling said power switch (22) to said interface control (28) and receiving a signal (26) therefrom;

connecting and removing said supply voltage (24) to each one of said plurality of CPUs (32) upon receiving with said power switch (22) said signal (26) from said interface control (28); and reacting to said faults in each of said plurality of CPUs (32) by providing said signal (26) to said power switch (22) from said interface control circuit (28), removing said supply voltage (24) and simultaneously adjusting said CPU input (33i) to prevent damage to each of said plurality of CPUs (32); the fault-free CPUs of said plurality of CPUs (32) being permitted to continue operating without affecting a running software application.

21. A method as claimed in claim 20, in which the step of operating a plurality of CPUs (32) includes operating at least three CPUs (32).

22. A method as claimed in claim 20, in which in which the step of operating a plurality of CPUs (32) includes operating said CPUs (32) which are commercial, non-radiation hardened chips.

23. A method as claimed in claim 20, in which the step of operating a plurality of CPUs (32) includes operating said CPUs (32) which are reduced instruction set CPUs (RISC) (32).

24. A method as claimed in claim 20, further comprising the steps of:

providing a system bus (12);

providing a first computer (11a); said first computer (11a) including said plurality of CPUs (32), said voting logic (252), said interface control (28), said power switch (22) and said couplings;

coupling said first computer (11a) to said system bus (12);

further providing in said first computer (11a)
a system memory (46);
a memory controller (36);
coupling said memory controller (36) to said voting logic (252), said system memory (46) and said system bus (12);

providing a second computer (11b) substantially identical to said first computer (11a);
coupling said second computer (11b) to said system bus (12) and maintaining said second computer (11b) as an error-free replacement for said first computer (11a);

providing a memory output (37a) to said memory controller (36) with said system memory (46); distributing equally said memory output (37a) to each of said plurality of CPUs (32) as said CPU input (33i), through said memory controller (36) and said voting logic (252);

obtaining a voted output signal (35) having a value of said majority of said CPU outputs (33o) by agreement of a majority of said CPU outputs (33o) in said voting logic (252);

detecting disagreement of any said CPU output (33o) with a majority of said CPU outputs (33o) in said voting logic (252) and producing an error signal (68) thereby; and re-synchronizing (130) said plurality of CPUs (32) in said first computer (11a) upon prompting by said error signal (68); and removing said supply voltage (24) from a disagreeing said CPU (32) and simultaneously adjusting said CPU input (33i) to said disagreeing CPU (32) to prevent damage when a persistent said disagreement indicates a latchup condition.

25. A method as claimed in claim 24, further including the step of substituting said second computer (11b) for said first computer (11a) upon disagreement of said CPU outputs (33o) being supplied to said voting logic (252) when less than two of said CPUs (32) is without error.

26. A method as claimed in claim 25, in which the steps of re-synchronizing said CPUs (32), removing said supply voltage (24) and substituting said second computer (11b) for said first computer (11a) are controlled by software run by said plurality of CPUs (32).

27. A method as claimed in claim 25, further including the step of substituting said second computer (11b) for said first computer (11a) when at least two of said plurality of CPUs (32) have failed.

28. A method as claimed in claim 27, in which each one of said plurality of CPUs (32) is in one of the following stable states: enabled and voting; commanded disabled; non-agreement and disabled; bypassed; and powered down.

29. A method of non-intrusive power management for computer systems comprising the steps of:
  providing a system bus (12);
  providing a computer (11a) having a plurality of central processing units (CPUs) (32); each of said plurality of central processing units (32) having a CPU input (33i) and a CPU output (33o);
  operating said CPUs (32) running a software application in synchronism, each operating step of each of said plurality of central processing units (32) being accomplished in parallel and substantially simultaneously with each of the other of said plurality of CPUs each CPU clock cycle;
  providing a voter (34) having a voted output (35) within said computer (11a);
  said voter (34) being radiation tolerant;
  coupling said voter (34) to each said CPU output (33o);
  providing a memory (46);
  providing a memory controller (36) having a vote status and control circuit (38), a memory interface (40) and a system bus interface (42);
  coupling said memory controller (36) to said voter (34), to said system bus (12) through said bus interface (42), and to said memory (46) through said memory interface (40);
  providing a memory output (37a) from said memory (46) to said memory controller (36); distributing said memory output (37a) equally as input (33i) to each of said CPUs (32) through said memory controller (36) and said voter (34);
  providing CPU output (33o) from each of said plurality of CPUs (34) as input to said voter (34) for comparison;
  comparing said CPU output (33o) in said voter (34);
  providing said voted output (35) from said voter (34) as input (37b) to said system memory (46), said vote status and control circuit (38) and said system computer bus (32);
    agreement of a majority of said CPU outputs (33o) supplied to said voter (34) resulting in said voted output (35) having a value of said majority of said CPU outputs (33o);
  detecting disagreement of said CPU output (33o) with a majority of said CPU outputs (33o) by said voter (34) and producing thereby an error signal (68);
  sending said error signal (68) to said vote status and control circuit (38);
  re-synchronizing said plurality of CPUs (32) with said vote status and control circuit (36) when said disagreement of said CPU output (33o) is detected; and
  removing said supply voltage (24) from a disagreeing said CPU (32) and simultaneously adjusting said CPU input (33i) to ground potential at said disagreeing CPU (32) without terminating said running software application, when said disagreement indicates a latchup condition.

30. A method as claimed in claim 29, further including the step of substituting an error-free computer (11b) for a faulty said computer (11a) by action of said vote status and control circuit (36) when less than two of said plurality of CPUs (32) are without error.

31. A method as claimed in claim 30, further including the step of substituting an error-free computer (11b) for a faulty said computer (11a) when at least two said CPUs (32) have failed.

* * * * *